Dec. 23, 1952    J. J. KURLAND ET AL    2,623,101
HERMETICALLY SEALED ELECTRICAL DEVICE
Filed May 12, 1951    2 SHEETS—SHEET 1
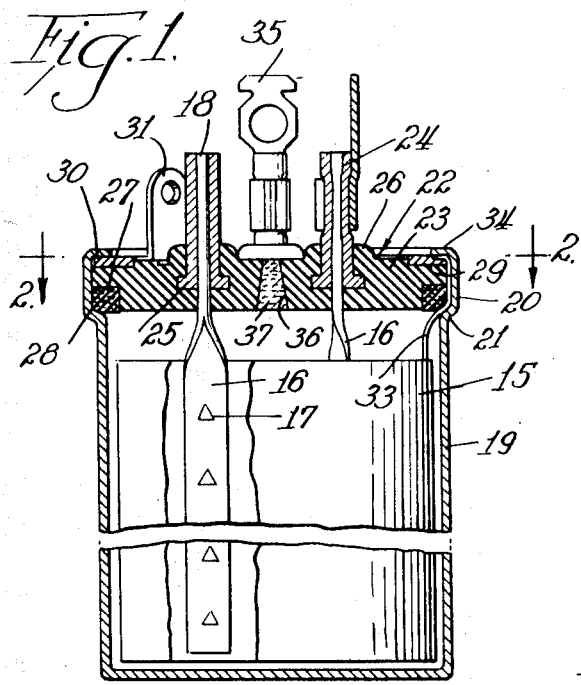
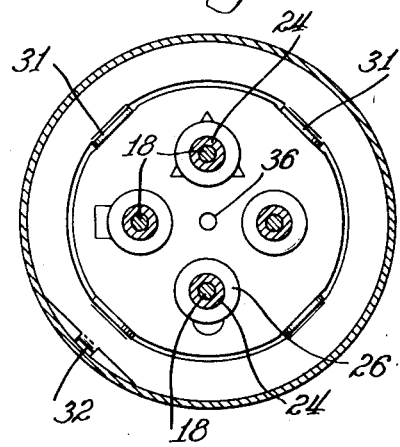
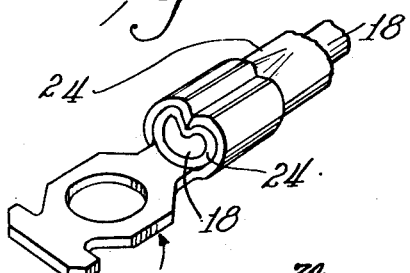
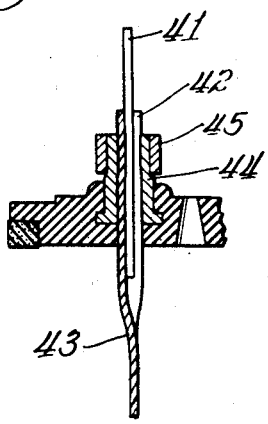
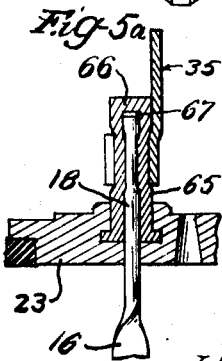
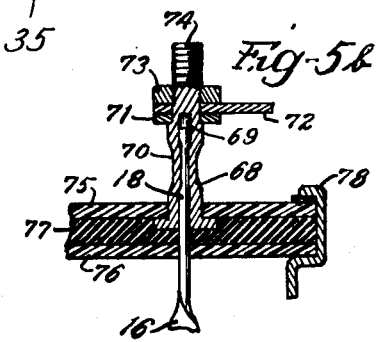
INVENTORS.
Jerome J. Kurland
and Joseph J. Kurland
By Mann, Brown, and Hausmann
Att'ys Dec. 23, 1952   J. J. KURLAND ET AL   2,623,101
HERMETICALLY SEALED ELECTRICAL DEVICE
Filed May 12, 1951                            2 SHEETS—SHEET 2
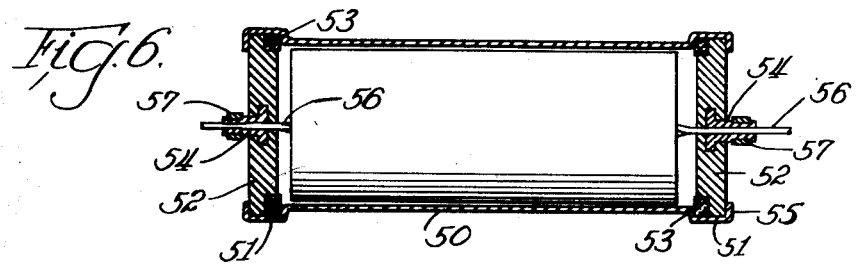
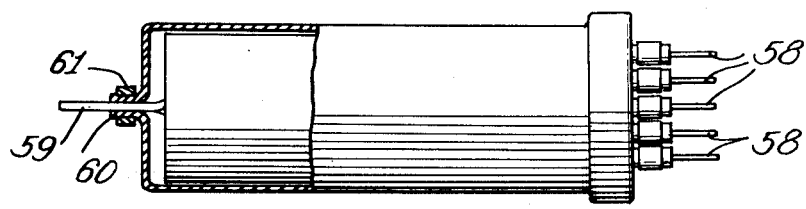
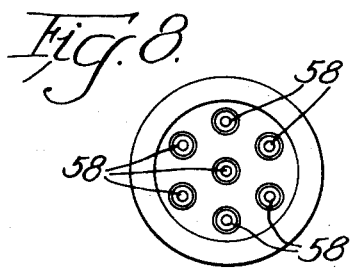
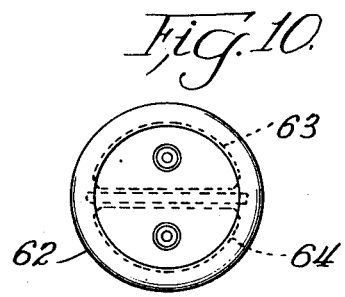
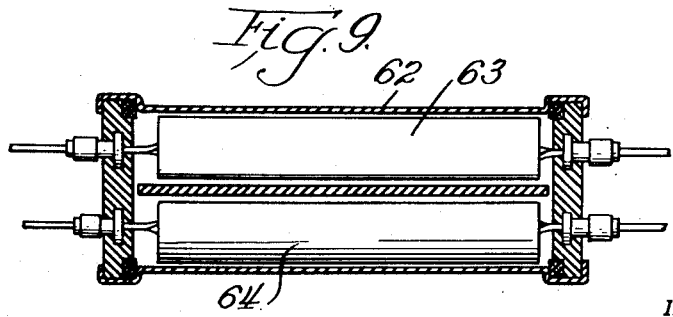
INVENTORS.
Jerome J. Kurland
and Joseph J. Kurland
By: Mann, Brown and Hansmann
Attys.

Patented Dec. 23, 1952

2,623,101

UNITED STATES PATENT OFFICE 2,623,101

HERMETICALLY SEALED ELECTRICAL DEVICE

Jerome J. Kurland, Chicago, and Joseph J. Kurland, Glencoe, Ill.

Application May 12, 1951, Serial No. 226,038

9 Claims. (Cl. 175—315)

This invention relates to hermetically sealed electrical devices, and particularly those in which it is desirable to carry a lead wire through a wall of the device.

More particularly, the invention concerns itself with capacitors, both of the electrolytic and electrostatic types, and one of the principal objects of the invention is to provide a simple and economical way for effecting an electrical connection between a condenser foil and an external piece of equipment.

The prior art is replete with examples of arrangements for carrying a lead from a condenser foil to the exterior of the condenser casing, but none of these arrangements have been entirely satisfactory, either from the standpoint of assembly procedures or sturdiness and reliability of construction. For example, Blackburn U. S. Patent No. 2,144,959 shows how a flat terminal strip may be brought through a tri-laminar cap structure and fastened to a soldering lug anchored between the top and middle layer of the composite cap structure to provide the desired stiffness, but there are many parts to handle and assembly of the cap structure is laborious and costly. Fruth U. S. Patent No. 2,020,408 shows how a wire may be flattened at one end for anchorage to the condenser foil, but this flattening of the wire changes its electrical and physical properties, and for that reason is undesirable. Waterman U. S. Patent No. 2,298,441 discloses a cap structure in which the terminal strip is carried through a specially formed rubber disc having moulded protuberances thereon which aid in forming the hermetic seal. Again assembly costs are high with this type of construction.

The principal object of this invention, therefore, is to provide a greatly simplified arrangement for carrying a condenser terminal to the exterior of the casing—one that is sturdy, inexpensive to fabricate, and easy to assemble. It is a further object of the invention to provide a construction of this type that lends itself to many applications, not only those related to electrolytic capacitors, but also other types of capacitors and electrical equipment.

A still further object of the invention is to provide an arrangement in which less space is consumed by the condenser within its container, and in which more terminals may be brought through a cap of given area than has heretofore been possible.

Further and other objects of the invention will become apparent as the description is read in conjunction with the drawings, in which Fig. 1 is a vertical cross-sectional view showing a preferred form of the invention;

Fig. 2 is a plan elevational view of the same;

Fig. 3 shows the soldering lug, eyelet, and terminal after the soldering lug has been crimped in place;

Fig. 4 shows a modified form of the invention in which the condenser terminal has a lead wire formed as a part of the assembly;

Fig. 5 shows a collet which may be used in place of a soldering lug in effecting the hermetic seal;

Fig. 5$^a$ shows a modified form of the terminal connection and seal;

Fig. 5$^b$ shows still another modification of the same;

Fig. 6 is a vertical sectional view showing a simplified arrangement for mounting either an electrostatic or an electrolytic capacitor within a sealed container;

Fig. 7 shows the manner in which a number of electrodes may be extended through one end of a condenser container with a common electrode extending through the other end of the container with hermetic sealing;

Fig. 8 is an end elevational view showing the arrangement of the electrodes in Fig. 7;

Fig. 9 shows another modified form of the invention; and

Fig. 10 is an end elevational view of the form of the invention shown in Fig. 9.

It will be understood that certain preferred forms of the invention have been shown in the drawings and will hereafter be described for the purpose of complying with Section 4888 of the Revised Statutes, but the appended claims should not be limited by these specific disclosures unless required by the prior art.

In the construction of electrolytic capacitors it has been customary to stake a terminal strip to the anode foil and then pass it through a cap structure such as shown in Blackburn U. S. Patent No. 2,144,959, or some similar cap structure. When a construction such as shown in the Blackburn patent is used, the desired stiffness for the soldering lug is achieved by anchoring a horizontal flange portion of the lug beneath the upper, relatively stiff disc, and the seal between the terminal strip and the cap is achieved by the compression of the inner pliable disc between the two outer, relatively rigid discs as the end of the cap is spun over the outer disc. The time required to thread the terminals through the three disc components of the cap, to handle and insert the soldering lugs through the top disc, and the final crimping operation has always been objectionable and has unduly increased the cost of the condenser construction. Furthermore, variations in the composition of the pliable disc sometimes results in an imperfect seal.

In the present invention simplification is achieved through the ingenious use of a specially formed terminal strip which is the subject of a separate application filed concurrently herewith. It has been the practice in some condenser constructions to take a wire and flatten one end so that it may be staked to the condenser foil, as shown, for example, in Fruth U. S. Patent No. 2,020,408, but this has the objection of changing the electrical and physical properties of the wire to the extent that the electrical characteristics of the capacitor are affected. The blow required to flatten the wire breaks down the anodic film on the strip, increases its electrical resistance, and tends to make the connection between the flat portion of the strip and the rounded portion rather brittle so that it is prone to crack when subjected to severe vibrations. Furthermore, such strips must be preformed and require piece handling when being staked to the foil.

In the present invention, instead of taking a round wire and flattening one end for attachment to the condenser foil, a constant width terminal ribbon that has been anodized and is otherwise of appropriate electrical characteristics is staked to the condenser foil and the protruding end is then shaped into rod form of circular cross-section so that it may be passed through a simplified cap construction. This has the advantage that the ribbon can be fed automatically from a spool in selected lengths for staking to the foil, and the anodic film is not disturbed during the staking or forming operation nor are the physical characteristics of the metal changed to any marked degree.

Referring now to Fig. 1 which shows an electrolytic capacitor, it will be seen that the capacitor pack 15 is provided with a plurality of anode terminal strips 16 which are suitably staked in a conventional manner to the anode foils, as indicated diagrammatically at 17. The terminal strips 16 are preferably of aluminum, as is also the anode foil.

The upper end of each terminal strip 16 is formed into a rodlike extension 18 of circular cross-section, this being accomplished in the manner disclosed in our co-pending application filed May 16, 1950, Serial No. 162,372, the disclosure of which is specifically incorporated herein by reference.

The condenser pack 15 is mounted within a tubular can 19, also preferably aluminum, and the upper end of the can is enlarged at 20 to provide a shoulder 21 upon which the cap structure, generally designated 22, rests.

The cap structure 22 comprises a rigid moulded piece 23, preferably of Bakelite or similar hard insulating material, and aluminum eyelets 24 are moulded permanently into the cap during the moulding process. The eyelets 24 are provided with enlargements 25 so that they are rigidly anchored to the cap 23. If desired, the eyelets may be of straight cylindrical form without the flanges 25, and may be press fitted into suitable openings provided in the cap, and this is a matter of choice.

Preferably the portion of the cap immediately adjacent to each eyelet 24 is enlarged, as indicated at 26, to provide aditional strength and to resist lateral forces that may be applied to the eyelets 24.

The cap 23 is provided with an annular recess 27 to receive a rubber gasket 28, and similarly the upper portion of the cap is recessed, as indicated at 29, to receive a metal mounting ring 30 which is provided with mounting lugs 31 that are adapted to be twisted or bent to secure the condenser in place after the lugs 31 have been passed through the mating slots provided in the chassis or other supporting framework adapted to receive the condenser. The correct angular position for the mounting ring 30 with respect to the various terminals may be readily provided for by a small tooth 32 which interengages a mating notch provided in the cap 23.

In assembling the condenser the cap 23, with its eyelets 24, is first slipped over the cylindrical extensions 18 of the terminal strips (there may be one or more, depending upon the type of capacitor), and the cap with its sealing gasket 28 and mounting ring 29 is then seated on the shoulder 21 of the can 19. The mounting ring 30 is electrically connected in a conventional manner to the cathode terminal strip 33, as shown in Fig. 1. The rim 34 of the can is then spun down over the mounting ring 30 with considerable pressure, which effectively seals the rim of the cap 23 with respect to the walls of the can of the container 19.

The opening in the eyelet 24 is substantially equal in diameter to the outer diameter of the cylindrical extension 18, but sufficient clearance is provided so that the extension 18 may be readily received within the opening in the eyelet during assembly.

After the cap 23 has been firmly set in place by spinning over the end 34 of the can, a soldering lug, generally designated 35, is slipped over each eyelet and crimped in place. The soldering lug 35 is preferably formed of steel and is shaped to slip readily over the eyelet 24. A crimping tool then applies a lateral force of considerable amount, preferably on the order of 3,000 pounds per square inch, to deform the lug, as shown in Fig. 3, and cold-flow the metal encompassed thereby into a solid hermetically sealed mass. This high pressure crimping operation effectively locks the soldering lug to the eyelet 24 which, in turn, is rigidly anchored in the cap 23 and simultaneously closes up any communication between the exterior and interior of the container 19 through the terminal connection.

The simplicity with which the terminal structure is applied and carried through the cap is readily apparent. The treminal strip 16, which may be either preformed before staking to the condenser pack or may be formed with the cylindrical extension 18 after the staking operation, is simply slipped into the eyelets 24, the cap 23 is then secured to the can by spinning over the above end 34, and the attachment of the soldering lugs by crimping causes the hermetic seal.

The opening 36 in the cap 23 is a blow hole which is normally filled with wax or similar material 37, the melting point of which is such that should the capacitor become overheated the pressure may be relieved by the melted wax being extruded through the tapered opening 36.

It should be understood that the soldering lug for one of the terminals has been deliberately omitted to better illustrate the construction.

As disclosed in our co-pending application Serial No. 162,372, filed May 16, 1950, a wire 41 may be formed into the cylindrical extension 42 of the terminal strip 43 (see Fig. 4), so that the wire 41 may be carried to any desired point of connection. If the wire is to be soldered to some other electrical part, it is preferably of tinned copper. Since the terminal lug in this instance is not required, the desired hermetic seal may be effected either by crimping the eyelet 44 to the composite terminal structure which includes the wire and enveloping cylindrical extension 42, or a separate ferrule or collet may be applied to the protruding end of the eyelet 44 to provide additional strength and firmness of seal. To this end the collet 45 is preferably of soft steel so that, when once deformed, it will maintain its deformed shape.

In the form of the invention shown in Fig. 6, a capacitor is illustrated which shows how simple it is to effect hermetic seals when it is desired to have the cathode emerge from one end of the can and an anode from another. In this case the can 50 is provided with enlarged portions 51 at each end, and each closure cap comprises a moulded piece 52, a rubber gasket seal 53, and an eyelet 54 embedded in the moulded piece 52. Upon spinning over the ends of the can, as indicated at 55, the caps 52 are sealed in place and the terminal strips 56 which are threaded through the eyelets 54 (and correspond in form to the terminal strip 16 of Fig. 1) are then hermetically sealed by crimping the eyelet 54 to the protruding ends of the terminal strip, as indicated at 57.

It is obvious that this arrangement simplifies present manufacturing processes which normally require an internal soldering connection and which, because of such connection, makes it necessary to have the can substantially longer than as shown in Fig. 6.

In Fig. 7 a capacitor is shown which has a plurality of sections each with its own anode lead 58. In this case the common cathode terminal 59 may comprise the improved terminal strip of this invention, and it may be carried through an extruded protuberance 60 in the bottom of the can. The hermetic seal between the can and the terminal may be obtained by a crimping operation applied to the protuberance 60 itself, or, if preferred, an iron ferrule 61 corresponding to the ferrule 45 of Fig. 4 may be applied and then crimped in the manner of Fig. 3 to provide the desired hermetic sealing.

By employing the cap structure of this invention, a great many anodes may be carried out through either or both ends of the container, and Figs. 7 and 8 illustrate how these anodes may be arranged so that a single condenser may have more sections than now commercially feasible. The fact that the terminal strip itself, which is attached to the anode foil, can be carried right through the closure cap makes possible this close grouping of anodes. Obviously cathodes could also be grouped in this manner, if desired.

In Figs. 9 and 10 another arrangement is shown in which two or more capacitor sections may be mounted within the same shell 62 and have separate anode and cathode leads. In the capacitor shown in Figs. 9 and 10 two sections 63 and 64 are shown, but obviously any number might be employed.

It should be understood that in the forms of the invention shown in Figs. 6–10 inclusive, either the eyelets are crimped into the protruding terminals to form the hermetic seal, or a ferrule, such as 61, may be employed to facilitate the crimping operation, or, if desired, soldering lugs, such as those shown at 35 in Fig. 1, may be applied to the cap eyelets.

It will also be understood that in all such instances the form of the invention shown in Fig. 4 may be employed in which a wire is made an integral part of the terminal strip to provide thereby a continuous conductor for attachment to an external piece of equipment. Also, if desired, the eyelet may be tinned so that heat may be applied actually to heat-solder the tinned wire to the surrounded eyelet.

Instead of using eyelets 24, that are open at both ends, to receive the rodlike extensions 18 of the terminal strip 16, it is desirable, in some instances, to use a different form of eyelet, such as indicated at 65 in Fig. 5ª. The eyelet in this case is formed with an integrally closed upper end, as shown at 66, so that when the extension 18 of the terminal strip 16 is crimped to the eyelet when the terminal lug 35 is applied, the hermetic seal is already effected and it is unnecessary to rely upon the crimping operation to obtain the hermetic seal.

In practice the eyelet 65 is formed by drilling out the lower end of an aluminum rivet to provide a bore 67 which terminates short of the upper end of the eyelet, thereby leaving the end of the eyelet closed, as indicated at 66. The rodlike extension 18 is cut off to a prescribed length and is inserted in the bore 67 until it strikes the closed end thereof, or until it is adjacent to such end, with the result that when the terminal lug 35 or ferrule 45 is crimped to the eyelet a good electrical connection is made between the eyelet and the terminal strip 16, whereby the projecting end of the eyelet may be used appropriately for connection to other electric parts.

A still further modification of the eyelet construction is shown in Fig. 5ᵇ. In this embodiment of the invention the eyelet 68 is preferably made of larger diameter stock so that when it is drilled from the bottom to provide a bore 69 the side walls of the bore are of sufficient thickness so that they may be crimped into intimate electrical contact with the extension 18 of the terminal strip 16, as shown at 70. Of course, a metal ferrule may be used, if desired, but inasmuch as the bore 69 is integrally closed at the upper end so that the hermetic seal of the cap structure is not dependent upon the crimp 70, the use of a ferrule (normally of harder material) is not essential.

As shown in Fig. 5ᵇ, the upper end of the eyelet 68 may extend a substantial distance above the crimp 70 for ready attachment to other electrical parts, and to that end the eyelet 68 may be provided with a shoulder to support a washer 71 for convenient reception of a connecting wire or terminal 72 which may be clamped in place by a nut 73 screwed upon the upper threaded shank 74 of the eyelet 68. Other electrical connecting means may be provided above the crimp, if desired.

It should be borne in mind that in all embodiments of the invention disclosed in this application a hermetic seal is effected above the closure cap 23 between the eyelet embedded in the cap and the upwardly projecting extensions 18 of the terminal strip, either by the crimping operation or by using an eyelet that is integrally closed at the upper end. Since the eyelet is moulded into the cap material there is no opportunity for leakage on the outside of the eyelet, and hence the hermetic seal is completed. However, other means might be employed to effect a hermetic seal on the exterior of the eyelet, and one such possibility is illustrated in Fig. 5ᵇ by showing, instead of the moulded cap structure of Fig. 1

(which could be used) the so-called tri-laminar cap construction of the Blackburn U. S. Patent No. 2,144,959. The outer and inner relatively stiff discs are indicated at 75 and 76, respectively, and the inner disc, of relatively soft pliable material, such as unvulcanized rubber, is indicated at 77. When the three superposed layers of the cap construction are pressed together by the spinning over of the upper edge of the can, as 78, the pliable material 77 effectively seals the periphery of the eyelet 68 so that the hermetic seal is completed.

This application is a continuation-in-part of our earlier application, Serial No. 162,371, filed May 16, 1950, which is now abandoned.

We claim:

1. In a condenser, a cylindrical container open at both ends and having an outwardly facing annular shoulder formed on the inner surface of the container adjacent to each end, a condenser in the container including an anode foil and a cathode foil, an anodized flat terminal strip staked to the anode foil with a portion projecting therefrom in one direction, and a flat terminal strip staked to the cathode foil and having a portion thereof projecting laterally therefrom in the opposite direction, each of said terminal strips having the side margins of said portion bent toward each other to form a tube and die-compressed to render it substantially solid and of cylindrical form, and means for closing and hermetically sealing the open ends of said container, said means including a moulded cap adapted to seat upon one of said annular shoulders, an eyelet anchored in the cap having a tubular portion extending above the cap, said cylindrical portion of the terminal strip immediately adjacent thereto being telescopically received by said eyelet, and means for crimping the eyelet to the encased cylindrical portion of the terminal strip to form an hermetic seal therebetween, a resilient gasket interposed between the cap and said annular shoulder, the adjacent end of said container being spun over to expand said resilient gasket and form an hermetic seal between the container and said cap.

2. An hermetically sealed terminal structure for electrolytic condensers and the like, comprising a cap of insulating material, a metallic eyelet rigidly anchored in the cap and having a tubular portion extending outwardly of the cap with its outer end integrally closed, and an anodized flat terminal strip of single thickness metal having the side margins of one end thereof bent toward each other and die-compressed to form a substantially solid cylindrical end portion of circular cross section, said cylindrical end portion being inserted within said eyelet to an area above the upper level of the cap and into said tubular extension of the eyelet, within which area said telescoping end portion of the terminal strip and said tubular portion of the eyelet are crimped together to cold flow the two metals together and form a good electrical bond therebetween.

3. The terminal structure as set forth in claim 2, in which the upper closed end of the eyelet is provided with an external outwardly facing shoulder for the reception of an external connecting wire or the like.

4. An hermetically sealed terminal structure for electrolytic condensers and the like, comprising a cap of insulating material, a metallic eyelet rigidly anchored in the cap and having a tubular portion extending outwardly of the cap, and an anodized flat terminal strip of single thickness metal having the side margins of one end thereof bent toward each other and die-compressed to form a substantially solid cylindrical end portion of circular cross section, said cylindrical end portion being inserted within said eyelet to an area above the upper level of the cap and into said tubular extension of the eyelet, within which area said telescoping end portion of the terminal strip and said tubular portion of the eyelet are crimped together to cold flow the two metals together and form an hermetic seal between the eyelet and the terminal strip.

5. The terminal structure as set forth in claim 4 in which a wire is longitudinally encased within the die-compressed cylindrical end of the terminal strip and projects completely through the eyelet for external attachment to other electrical devices.

6. The terminal structure as set forth in claim 4 in which a steel lug is telescoped over the telescoping end portion of the terminal strip and the tubular extension of the eyelet and is forced into firm engagement with said eyelet during the crimping operation.

7. In combination with the terminal cap structure as set forth in claim 4, a cylindrical container closed at one end by said structure, said other end of the container being closed except for a cylindrical, outwardly extending tubular protuberance, and a cathode terminal strip having a cylindrical end of substantially circular cross section extending into said protuberance and crimped thereto.

8. In combination, a cylindrical container having sealed into both ends thereof the terminal cap structure as set forth in claim 4, except that the terminal cap structure at one end has its associated terminal strip either anodized or non-anodized.

9. The terminal structure as set forth in claim 4 and in which the insulating cap is formed of moldable material and the eyelet is provided with a laterally extending shoulder for anchoring the eyelet in the cap.

JEROME J. KURLAND.
JOSEPH J. KURLAND.

REFERENCES CITED

The following references are of record in the file of this patent:

UNITED STATES PATENTS

| Number | Name | Date |
|---|---|---|
| 2,144,959 | Blackburn | Jan. 24, 1939 |
| 2,204,217 | Herriger | June 11, 1940 |
| 2,246,933 | Deeley | June 24, 1941 |
| 2,274,327 | Georgiev | Feb. 24, 1942 |
| 2,385,792 | Carlson | Oct. 2, 1945 |
| 2,500,632 | Drake | Mar. 14, 1950 |